United States Patent [19]

Lecerf et al.

[11] Patent Number: 5,307,150
[45] Date of Patent: Apr. 26, 1994

[54] APPARATUS FOR AUTOMATICALLY TAKING A READING OF THE SHAPE AND/OR THE PROFILE OF THE INNER CONTOUR OF A FRAME RIM OF GLASSES

[75] Inventors: Michel J. M. Lecerf, La Saussaye; Jean-Pierre M. F. Langlois, Rouen, both of France

[73] Assignee: Buchmann Optical Engineering, Ypres, Belgium

[21] Appl. No.: 916,526

[22] Filed: Jul. 20, 1992

[30] Foreign Application Priority Data

Jul. 29, 1991 [FR] France .................. 91 09595

[51] Int. Cl.$^5$ .................................. G01B 11/24
[52] U.S. Cl. .................... 356/376; 356/377; 33/200
[58] Field of Search ............. 356/376, 377; 33/28, 33/200, 507, 1 M

[56] References Cited

U.S. PATENT DOCUMENTS

| | | | |
|---|---|---|---|
| 4,105,925 | 8/1978 | Rossol et al. | 356/376 |
| 4,724,617 | 2/1988 | Logan et al. | 33/28 |
| 4,803,371 | 2/1989 | Durland | 356/383 |
| 4,939,379 | 7/1990 | Horn | 356/376 |
| 4,983,043 | 1/1991 | Harding | 356/376 |
| 4,991,305 | 2/1991 | Saigo et al. | 33/28 |
| 5,121,550 | 6/1992 | Wood et al. | 33/28 |

FOREIGN PATENT DOCUMENTS 0330429  8/1989  European Pat. Off. .

Primary Examiner—James C. Housel
Assistant Examiner—Rachel Freed
Attorney, Agent, or Firm—Martin Smolowitz

[57] ABSTRACT

The apparatus comprises a device which explores without contact the inner contour of the frame rim (16) and employs an optical device (30) for sensing the image of characteristic points of the rim inner contour, an analyzer for analyzing the sensed images for determining the spatial coordinates of the characteristic points, and a calculating device for reconstituting the shape and/or the profile of the contour of the frame rim from these spatial coordinates.

10 Claims, 2 Drawing Sheets

APPARATUS FOR AUTOMATICALLY TAKING A READING OF THE SHAPE AND/OR THE PROFILE OF THE INNER CONTOUR OF A FRAME RIM OF GLASSES

BACKGROUND OF THE INVENTION

The present invention relates to an apparatus for automatically taking a reading of the shape and/or the profile of the inner contour of a rim of a frame of glasses.

To construct pairs of corrective glasses by an automated procedure it must be possible to effect precisely and automatically the grinding of the lenses of these glasses with a grinding machine controlled with data, which include in particular the geometrical parameters providing an exact definition of the shape and profile of the outer contour of the lenses. These parameters depend, on one hand, on the physiological parameters of the user of the pair of glasses, such as in particular the distance between the pupils of the eyes and the position of the eye with respect to the lens and, on the other hand, on the shape and/or the profile of the inner contour of the frame rim of the glasses receiving the lens.

Many methods and devices have been proposed which permit automatically taking a reading of the last-mentioned data. However, it has been found that all the devices employed at the present time do not permit obtaining a sufficient precision of the reading or a sufficiently fine definition, in particular owing to the use of mechanical followers which are only rarely perfectly adapted to the profile of the inner contour of the rim explored by the followers, as well as a complete angular scanning of this inner contour.

SUMMARY OF THE INVENTION

In order to overcome these drawbacks of known devices, the present invention proposes an apparatus of the aforementioned type comprising a device which explores the inner contour of a glasses frame rim non-contact means To this end, the apparatus comprises optical means for sensing the image of characteristic points of the frame rim inner contour, means for analyzing the sensed images for determining the spatial coordinates of the characteristic points and calculating means for reconstituting the shape and/or the profile of the contour of the frame rim from said spatial coordinates wherein;

the means for sensing the image comprise at least one source of illumination of the inner contour of the frame rim which produces a planar parallel beam of light which extends in a direction substantially perpendicular to the general plane of the frame rim, and means for optically recording the light rays of the incident beam reflected by said characteristic points.

For the purpose of taking frame reading of the shape and/or the profile of the inner contour of a rim whose profile has in cross section substantially the shape of a V whose median axis extends in a direction substantially parallel to the general plane of the frame, the characteristic points comprise a series of three points corresponding to the bottom of the V and to two points each pertaining one of the branches of the V, the images of which are sensed in succession for a series of cross sections of the contour angularly distributed along the inner contour; and the two points are the ends of the branches of the V.

The apparatus also comprises means for effecting a scanning of the inner contour of the frame rim by a relative displacement between the latter and the beam of light;

the scanning means comprise a frame carrier driven in rotation about an axis perpendicular to the general plane of the rim of which a reading is being taken, and driving means for driving the frame carrier in rotation step by step with a step corresponding to the angle between two consecutive cross sections of said series distributed along the rim inner contour;

the optical recording means comprises a photosensitive element arranged to be substantially parallel to the axis of rotation; and the apparatus comprises two sources of illumination which produce two parallel planar beams of light which are coplanar and make therebetween an angle the bisector of which is substantially parallel to the general plane of the frame rim.

BRIEF DESCRIPTION OF THE DRAWINGS

Further features and advantages of the invention will be apparent from the following detailed description with reference to the accompanying drawings, in which.

DESCRIPTION OF A PREFERRED EMBODIMENT OF THE INVENTION

Figure 1:
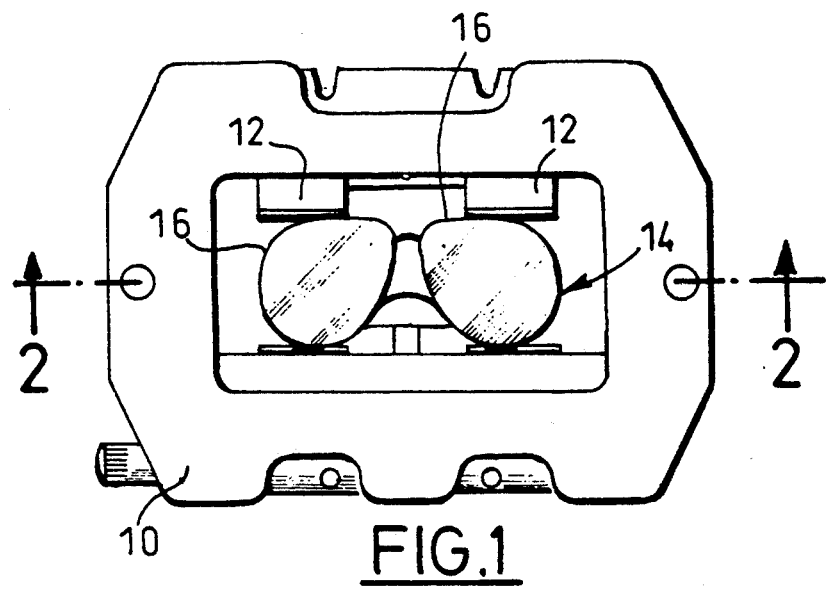
FIG. 1 is a diagrammatic top plan view of a frame carrier which is part of the apparatus according to the invention.
Figure 2:
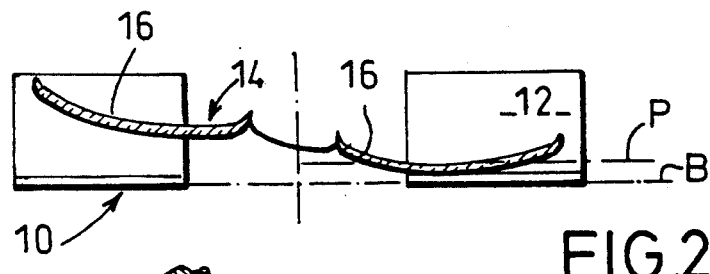
FIG. 2 is a sectional view taken at line 2—2 of FIG. 1.

FIGS. 1 and 2 show a frame carrier 10, which comprises movable jaws 12 whose function is to immobilize a frame 14 of glasses in a given reading position.

The glasses frame 14 comprises two rims 16 for which it is desired to automatically take a reading of the shape and profile of the inner contour of the two rims.

Figure 3:
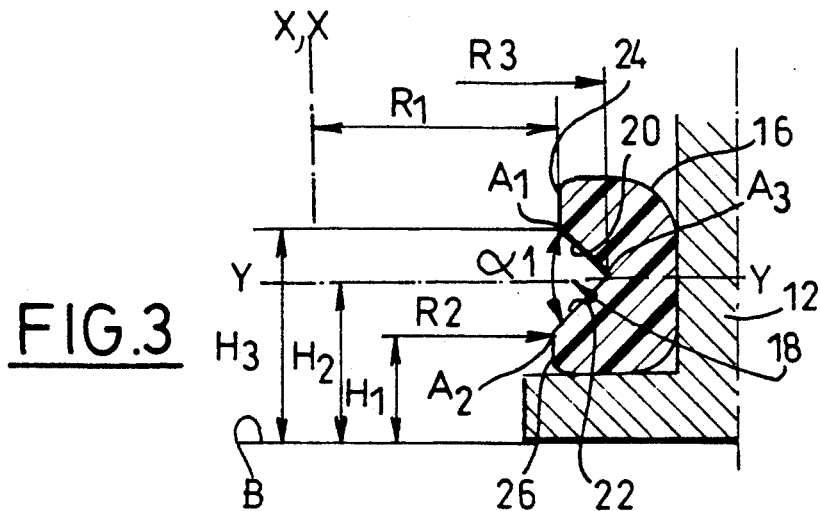
FIG. 3 is a diagram to a larger scale illustrating a section of the frame rim in position in the frame carrier.

To this end, the frame 14 is positioned in the frame carrier 10 in the manner illustrated in FIG. 2 in which the general plane P of the frame rim of which a reading is desired to be taken, namely the right rim as viewed in FIGS. 1 and 2, is parallel to the basic reference plane B of the frame carrier. In the embodiment illustrated in FIG. 3, the frame rim 16 has in section a V-shaped profile 18. The V comprises two branches 20 and 22 the outer ends of which define, in cross-section as illustrated in FIG. 3, two points A1 and A2. The two branches 20 and 22 join at a point A3 constituting the inner end of the inner profile 18, also termed bezel, of the frame rim 16.

The branches 20 and 22 are respectively prolonged by two portions 24 and 26, which extend in planes substantially perpendicular to the reference plane B.

With respect to the reference plane B, the characteristic points A1, A2 and A3 are respectively located at vertical dimensions or altitudes H1, H2 and H3 from the plane B.

Likewise, the characteristic points are respectively located at characteristic radii R1, R2 and R3 of an axis X—X which is perpendicular to the reference plane B and constitutes the axis of rotation of the frame rim 16 when it is desired to take the reading of the rim inner contour shape and profile.

According to current design of frame rims of glasses, the bisector line Y—Y of the angle of the opening $\alpha 1$ of the V-shaped profile is substantially parallel to the general plane P of the frame rim and therefore to the reference plane B.

Figure 4:
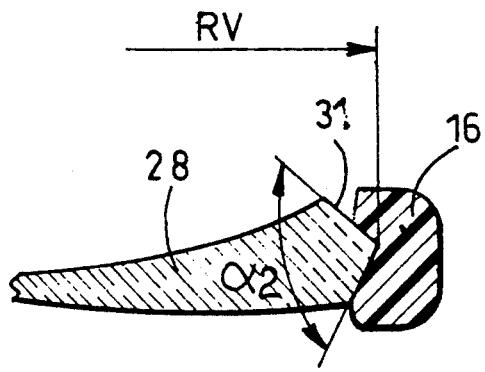
FIG. 4 is a diagram illustrating a portion of an optically corrective lens in position in the frame rim.

Knowledge of the geometrical parameters of shape and profile of the inner contour of the frame rim 16 requires the knowledge, for a series of cross-sections of the frame rim 16, of the values R1, R2, R3, H1, H2, H3 and the angle $\alpha 1$. All of these values must be known for a series of sections which are evenly distributed around the axis X—X so as to constitute a file of spatial coordinates of characteristic, points of the inner contour of the frame rim 16 which values may then be used, by known calculating means, for reconstituting the shape and/or the profile of the inner contour of the frame rim so as to permit the most exact grinding possible of a lens 28 which is illustrated in position in the rim 16 in FIG. 4.

The lens 28 has a V-shaped projecting beveled contour 31 whose angle of opening $\alpha 2$ is produced by grinding.

For grinding the lens it is required to know, for each cross-section, of the rim 16 the true radius RV (see FIG. 4) by putting in concordance the points A1 and A2 with the angle $\alpha 2$. If the angle $\alpha 1$ is larger than the angle $\alpha 2$, the radius value R3 is chosen as the true radius RV. The file of all the true radii RV permits, for each given cross section, grinding the lens with a contour profile which exactly corresponds to the shape and the position of the previously-read inner contour of the frame rim.

The lateral position of the bevel 31 which must be produced on the outer contour of the lens 28 is obtained in a precise manner with the aid of the parameters H1, H2 and H3.

Figure 6:
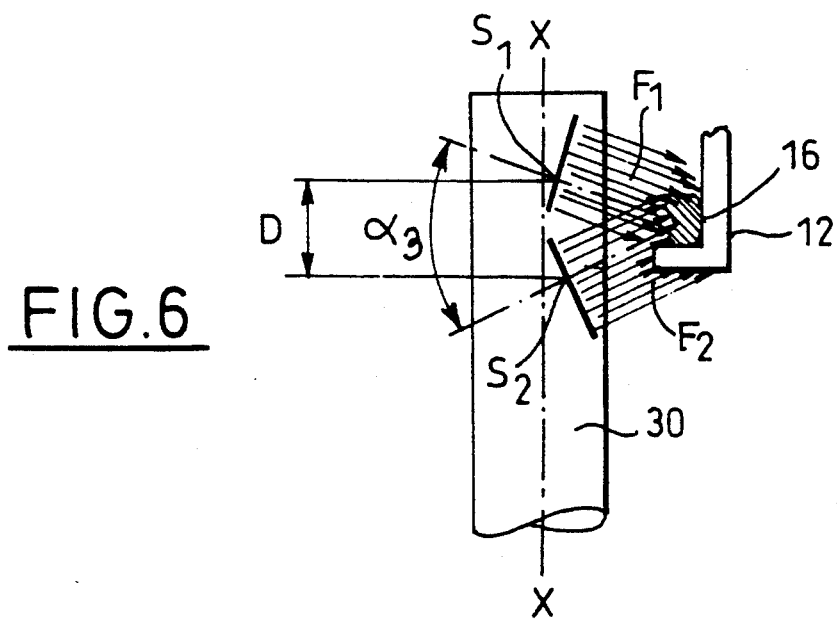
FIG. 6 is a simplified diagram illustrating the means for illuminating the frame rim and the photosensitive element.

According to the invention, the exploration of the inner contour of the rim 16 is effected without mechanical contact. For this purpose, and in the preferred embodiment diagrammatically represented in FIG. 6, the apparatus comprises two sources of light S1 and S2. Each source of light produces a beam of light having parallel incident rays extending in a plane which contains the axis X—X and is therefore perpendicular to the reference plane B.

The sources of light S1 and S2 therefore emit two coplanar beams F1 and F2 the rays of which make therebetween a known angle $\alpha 3$ the bisector of which is parallel to the plane B.

Knowledge of the angle $\alpha 3$, or of the distance D between two points of the sources of light S1 and S2, permits calculating, from images of rays reflected by the inner profile 18 of the frame rim 16 which are sensed or detected by sensing means 30, the different previously-mentioned parameters.

The means 30 are photosensitive means, such as for example a camera, so disposed with respect to the frame rim 16 and to the sources of light S1 and S2 as to sense the image of the rays reflected in a plane substantially perpendicular to the plane common to the incident beams F1 and F2.

Figure 5:
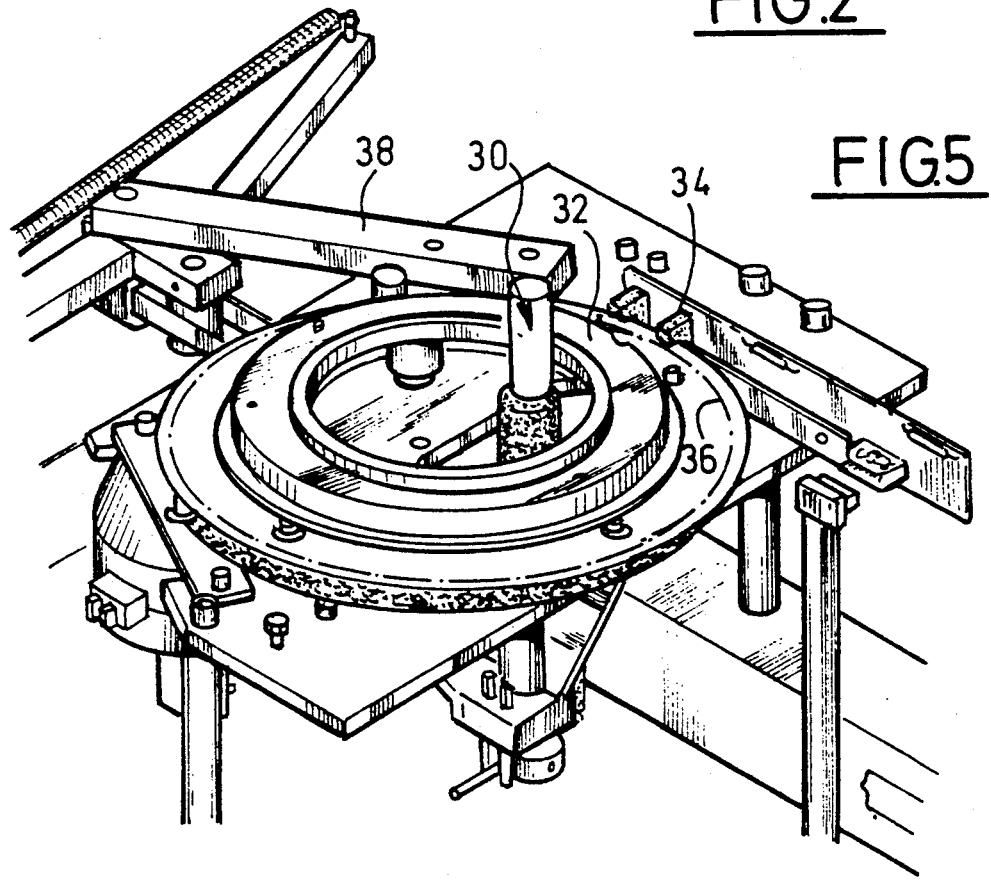
FIG. 5 is a diagrammatic perspective view of the means for driving in rotation the frame carrier and other components of the apparatus according to the invention.

FIG. 5 illustrates driving means 32 for driving the frame carrier 10 in rotation step by step, and scanning means 34 and 36 whereby it is possible to know in a precise manner the angular position of the frame rim 16 with respect to the axis of rotation X—X.

The scanning means 34 and 36 are for example formed by an optical coding disc 36 and sensors 34.

The means 30 for sensing the reflected image are for example arranged at the end of an articulated arm 38, which permits positioning them within the frame rim 16.

The scanning means 30, 34 and 36 are of course connected to means (not shown) for recording, for each angular position of the frame rim, the reflected image sensed by the sensing means 30, then analyzing these images so as to convert them into a series of numerical signals which are then analyzed and processed by calculation with the aid of computer means of known type (not illustrated in the drawings).

What is claimed is:

1. Apparatus for automatically taking readings of the shape and profile of the inner contour of a frame rim of glasses, said apparatus comprising in combination:

optical means for sensing image characteristic points of the inner contour of the frame rim;

means for analyzing the sensed images of said characteristic points for determining spatial coordinates of the characteristic points;

calculating means for reconstituting the shape and profile of the contour of said glasses frame rim from said spatial coordinates, wherein said frame rim lies in a general plane and said image-sensing means comprises at least one source of illumination of said inner contour of said frame rim and which produces a planar parallel beam of light extending in a direction substantially perpendicular to said general plane; and optical recording means for recording rays of the incident beams reflected by said characteristic points, and wherein said frame rim has a profile having in section substantially the shape of a V having a median axis which extends in a direction substantially parallel to said general plane, said characteristic points comprising a series of three points corresponding to an inner end point of said V and to two points each pertaining to one of two branches of said V, the images of which points are sensed in succession for a series of cross-sections of said contour angularly distributed along said inner contour of said frame rim.

2. Apparatus according to claim 1, wherein said two points pertaining to said branches of said V are at outer ends of said branches.

3. Apparatus according to claim 1, wherein said apparatus further comprises scanning means for effecting a scanning of said inner contour of said frame rim by a relative displacement between said frame rim and said beam of light.

4. Apparatus according to claim 3, wherein said two points pertaining to said branches of said V are at outer ends of said branches.

5. Apparatus according to claim 3, wherein said scanning means comprise a frame carrier rotatable about an axis perpendicular to said general plane, and driving means drivingly connected to said frame carrier for driving said carrier in rotation step by step with a step which corresponds to an angle between two consecutive cross-sections of said series angularly distributed along said inner contour.

6. Apparatus according to claim 5, wherein said two points pertaining to said branches of said V are at outer ends of said branches.

7. Apparatus according to claim 5, wherein said optical recording means comprise a photosensitive element arranged to be substantially parallel to said axis of rotation.

8. Apparatus according to claim 7, wherein said two points pertaining to said branches of said V are at outer ends of said branches.

9. Apparatus according to claim 1, wherein said image-sensing means comprise at least two sources of illumination of said inner contour of said frame rim each of which produces a planar parallel beam of light extending in a direction substantially perpendicular to said general plane, and optical recording means for recording the two rays of the incident beam reflected by said characteristic points, said two sources of illumination producing coplanar, planar, parallel beams of light the bisector of each of which beams is substantially parallel to said general plane.

10. Apparatus according to claim 9, wherein said two points pertaining to said branches of said V are at outer ends of said branches.

* * * * *